US010525858B2

(12) United States Patent
Hickman Guevara et al.

(10) Patent No.: US 10,525,858 B2
(45) Date of Patent: Jan. 7, 2020

(54) DEPLOYABLE NECK SUPPORT DISPOSED WITHIN AN INTERIOR OF A HEADREST

(71) Applicant: Ford Global Technologies, LLC, Dearborn, MI (US)

(72) Inventors: Alfonso Hickman Guevara, Tlalnepantla (MX); Luis Jesus Chavela Guerra, Mexico City (MX); Luis Olmos Gonzalez, Tlalnepantla (MX); David Mercado, Mexico City (MX); Cuauhtemoc Quiroz, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 218 days.

(21) Appl. No.: 15/825,570

(22) Filed: Nov. 29, 2017

(65) Prior Publication Data

US 2019/0160984 A1 May 30, 2019

(51) Int. Cl.
| | |
|---|---|
| *B60N 2/806* | (2018.01) |
| *B60N 2/879* | (2018.01) |
| *B60N 3/10* | (2006.01) |
| *B60N 2/885* | (2018.01) |
| *B60N 2/80* | (2018.01) |
| *A47C 7/38* | (2006.01) |

(52) U.S. Cl.
CPC ............ *B60N 2/806* (2018.02); *B60N 2/879* (2018.02); *B60N 2/885* (2018.02); *B60N 3/106* (2013.01); *A47C 7/38* (2013.01); *B60N 2002/899* (2018.02)

(58) Field of Classification Search
None
See application file for complete search history.

(56) References Cited

U.S. PATENT DOCUMENTS

| | | | |
|---|---|---|---|
| 3,226,159 A | 12/1965 | Binding | |
| 5,330,255 A | 7/1994 | Stawicki | |
| 5,904,405 A * | 5/1999 | Wu | B60N 2/885 297/391 |
| 5,992,937 A | 11/1999 | Pilhall | |

(Continued)

FOREIGN PATENT DOCUMENTS

DE            3829470 C1 * 10/1989 ............... B60N 9/02

*Primary Examiner* — Sarah B McPartlin
(74) *Attorney, Agent, or Firm* — Vichit Chea; Price Heneveld LLP

(57) ABSTRACT

A headrest comprising an external surface surrounding an interior and a deployable neck support including: a non-deployed position wherein the deployable neck support is disposed in the interior; and a deployed position wherein the deployable neck support extends out of the interior and is configured to support a neck of an occupant of a seating assembly incorporating the headrest. The headrest includes a housing disposed in the interior. In the non-deployed position, the deployable neck support is housed within the housing. In the deployed position, a primary neck support section of the deployable neck support extends out of the housing. The deployable neck support can further include an inboard lateral neck support and an outboard lateral neck support, each having an enclosed position and an extended position. In the enclosed position, the inboard lateral neck support and outboard lateral neck support are housed within the primary neck support section.

20 Claims, 13 Drawing Sheets

(56) References Cited

U.S. PATENT DOCUMENTS

| | | | |
|---|---|---|---|
| 6,120,099 A * | 9/2000 | Reikerås | B60N 2/809 |
| | | | 297/391 |
| 6,158,812 A * | 12/2000 | Bonke | B60R 16/08 |
| | | | 297/391 |
| 6,616,235 B1 | 9/2003 | Khavari et al. | |
| 7,017,212 B2 | 3/2006 | Matthews Brown | |
| 8,820,830 B2 * | 9/2014 | Lich | B60N 2/0276 |
| | | | 297/216.13 |
| 8,985,622 B1 * | 3/2015 | Cannon | B60R 21/231 |
| | | | 280/730.2 |
| 2013/0181496 A1 * | 7/2013 | Nawaz | B60N 2/806 |
| | | | 297/408 |
| 2015/0197170 A1 | 7/2015 | Obukhov | |
| 2017/0197530 A1 | 7/2017 | Line et al. | |

* cited by examiner

DEPLOYABLE NECK SUPPORT DISPOSED WITHIN AN INTERIOR OF A HEADREST

FIELD OF THE INVENTION

The present invention generally relates to a headrest for a seating assembly of a vehicle, more specifically a headrest with a deployable neck support housed within an interior of the headrest.

BACKGROUND OF THE INVENTION

A vehicle, such as a car, truck, sports-utility vehicle, van, and the like typically include one or more seating assemblies. Such seating assemblies typically include a headrest. An occupant of the seating assembly including the headrest may desire to recline a seatback of the seating assembly, in order to rest.

SUMMARY OF THE INVENTION

According to a first aspect of the present invention, a headrest comprises an external surface surrounding an interior; and a deployable neck support including: a non-deployed position wherein the deployable neck support is disposed in the interior; and a deployed position wherein the deployable neck support extends out of the interior and is configured to support a neck of an occupant of a seating assembly incorporating the headrest.

Embodiments of the first aspect of the invention can include any one or a combination of the following features:
- a housing disposed in the interior, wherein, in the non-deployed position, the deployable neck support is housed within the housing, and wherein, in the deployed position, the deployable neck support extends out of the housing;
- the deployable neck support comprises a bottom surface, wherein, in the non-deployed position, the bottom surface is planar to a portion of the external surface of the headrest adjacent the bottom surface;
- the housing further includes a terminal edge surrounding an opening, and the terminal edge and the opening are disposed at a downward-facing portion of the headrest;
- in the non-deployed position, the terminal edge is planar to the portion of the external surface of the headrest adjacent the bottom surface of the deployable neck support;
- in moving from the non-deployed position to the deployed position, a primary neck support section of the deployable neck support slides at least partially out of the housing, through an opening of the housing;
- the primary neck support section includes a generally forward facing cushion;
- in moving from the non-deployed position to the deployed position, the primary neck support section slides generally downward;
- the deployable neck support further comprises an inboard lateral neck support and an outboard lateral neck support, each of the inboard lateral neck support and the outboard lateral neck support having an enclosed position and an extended position;
- in the enclosed position, the inboard lateral neck support and the outboard lateral neck support are housed within the primary neck support section;
- in the extended position, the inboard lateral neck support extends laterally from an inboard side of the primary neck support section and the outboard lateral neck support extends laterally from an outboard side of the primary neck support section;
- both the inboard lateral neck support and the outboard lateral neck support include a first section and a second section telescopically coupled to the first section;
- in the enclosed position, the second section is at least partially disposed within the first section;
- in the extended position, the second section is telescoped laterally outward from the first section;
- the inboard lateral neck support can transition from the enclosed position to the extended position independently of whether the outboard lateral neck support is in the enclosed position or the extended position;
- air pressure causes the inboard lateral neck support and the outboard lateral neck support to transition from the enclosed position to the extended position;
- the inboard side of the primary neck support section is part of an inboard member of the primary neck support section, and the outboard side of the primary neck support section is part of an outboard member of the primary neck support section;
- the inboard member and the outboard member can independently move from the non-deployed position to the deployed position;
- the inboard member of the primary neck support section is disposed in an inboard section of the housing when the inboard member is in the non-deployed position;
- the inboard member of the primary neck support section extends from the inboard section of the housing when the inboard member is in the deployed position;
- the outboard member of the primary neck support section is disposed in an outboard section of the housing when the outboard member is in the non-deployed position;
- the outboard member of the primary neck support section extends from the outboard section of the housing when the outboard member is in the deployed position;
- the inboard lateral neck support and the outboard lateral neck both further include a pull tab accessible to be pulled when the inboard lateral neck support and the outboard lateral neck support are in the enclosed position;
- the second section of both the inboard lateral neck support and the outboard lateral neck support includes a pull tab accessible to be pulled when the inboard lateral neck support and the outboard lateral neck support are in the enclosed position; and
- the primary neck support section further includes a pull tab accessible for pulling the primary neck support section toward the deployed position when the primary neck support section is in the non-deployed position.

According to a second aspect of the present invention, a seating assembly comprises: a seatback including a top portion; and a headrest extending from the top portion of the seatback, the headrest comprising: an external surface surrounding an interior; and a deployable neck support having a non-deployed position wherein the deployable neck support is disposed in the interior and a deployed position wherein the deployable neck support extends out of the interior and is configured to support a neck of an occupant of the seating assembly.

Embodiments of the second aspect of the invention can include any one or a combination of the following features:
- in the non-deployed position, the deployable neck support is housed within a housing disposed in the interior of the headrest;
- in the deployed position, the deployable neck support extends out of the housing;

in moving from the non-deployed position to the deployed position, a primary neck support section of the deployable neck support slides at least partially out of the housing, through the opening of the housing toward the top portion of the seatback;

in the enclosed position, an inboard lateral neck support and an outboard lateral neck support of the deployable neck support are housed within the primary neck support section;

in the extended position, the inboard lateral neck support extends laterally from an inboard side of the primary neck support section and the outboard lateral neck support extends laterally from an outboard side of the primary neck support section; and the inboard lateral neck support can transition from the enclosed position to the extended position independently of whether the outboard lateral neck support is in the enclosed position or the extended position.

According to a third aspect of the present invention, a vehicle comprises: a seating assembly comprising: a seatback including a top portion; and a headrest extending from the top portion of the seatback, the headrest comprising: an external surface surrounding an interior; and a deployable neck support having a non-deployed position wherein the deployable neck support is disposed in the interior and a deployed position wherein the deployable neck support extends out of the interior and is configured to support a neck of an occupant of the seating assembly.

Embodiments of the third aspect of the invention can include any one or a combination of the following features:

in the non-deployed position, the deployable neck support is housed within a housing disposed in the interior of the headrest;

in the deployed position, the deployable neck support extends out of the housing;

in moving from the non-deployed position to the deployed position, a primary neck support section of the deployable neck support slides at least partially out of the housing, through the opening of the housing toward the top portion of the seatback;

in the enclosed position, an inboard lateral neck support and an outboard lateral neck support of the deployable neck support are housed within the primary neck support section;

in the extended position, the inboard lateral neck support extends laterally from an inboard side of the primary neck support section and the outboard lateral neck support extends laterally from an outboard side of the primary neck support section; and the inboard lateral neck support can transition from the enclosed position to the extended position independently of whether the outboard lateral neck support is in the enclosed position or the extended position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
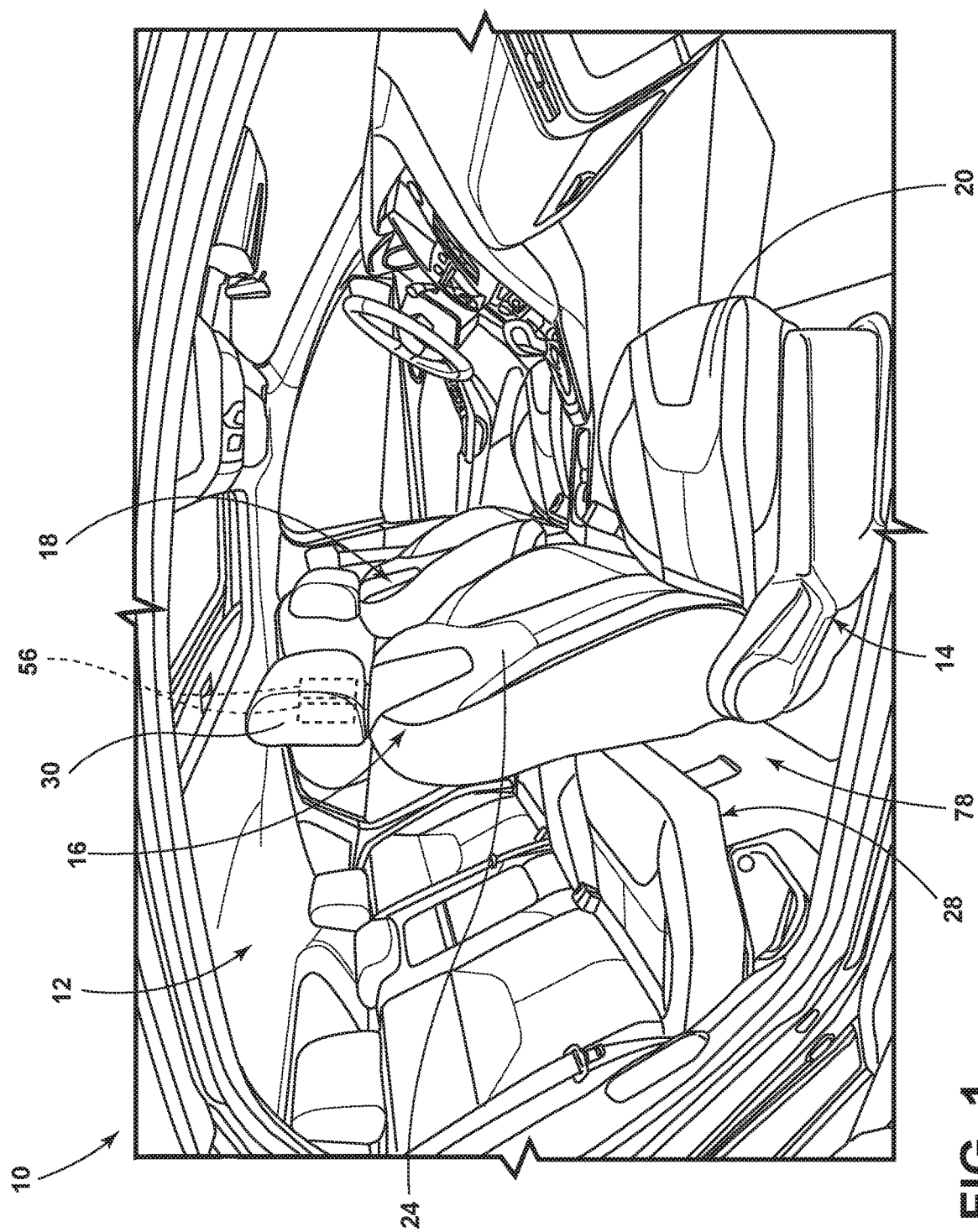
FIG. 1 is a perspective view of an interior of a vehicle, illustrating a first seating assembly disposed adjacent a second seating assembly forming a first row of seating.

For purposes of description herein, the terms "rearward," "downward," "forward," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, a vehicle 10 includes an interior 12. The interior 12 includes a first row of seating 14, typically including a first seating assembly 16 and a second seating assembly 18. The first row of seating 14 can be the forward-most row of seating in the interior 12. The first seating assembly 16 includes a seat 20 configured to support the lower portion of an occupant 22 (see FIG. 12) and a seatback 24 configured to support the upper portion of the occupant 22, such as the back 26 of the occupant 22. The first seating assembly 16 may be the seating assembly for a passenger occupant 22 of the vehicle 10, while the second seating assembly 18 may be the seating assembly designated for an operator occupant 22 of the vehicle 10. The interior 12 typically includes a second row of seating 28 located rearward of the first row of seating 14. The interior 12 can further include a third row of seating (not illustrated) disposed rearward of the second row of seating 28, and so on. As the second seating assembly 18, the second row of seating 28, the third row of seating, and any subsequent row of seating can incorporate the novel features of the first seating assembly 16 described herein in the same manner as the first seating assembly 16, only the first seating assembly 16 will be discussed with particularly hereinafter.

Figure 2:
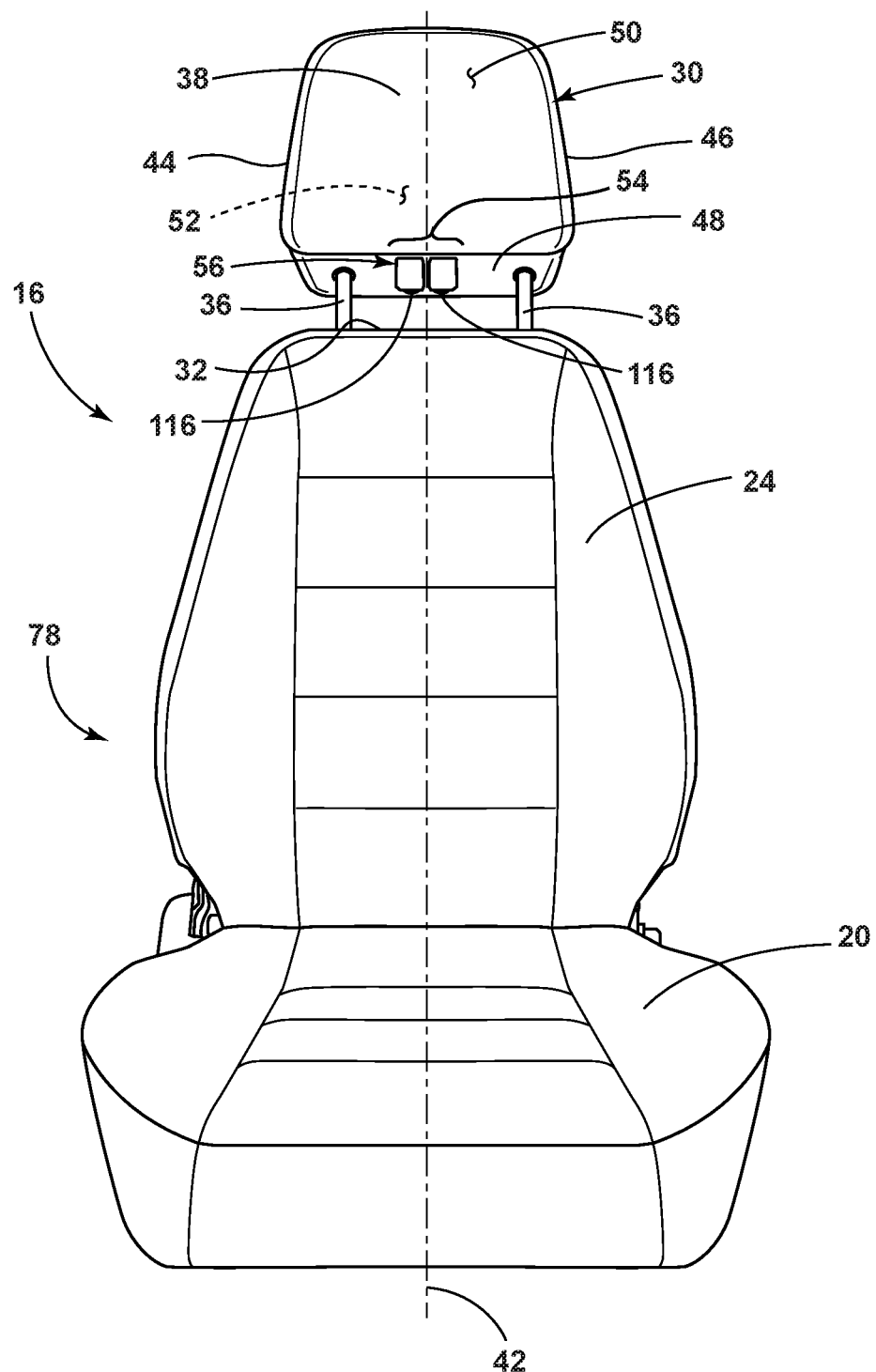
FIG. 2 is a front view of the first seating assembly of FIG. 1, illustrating a headrest adjustably coupled to a seatback.
Figure 6:
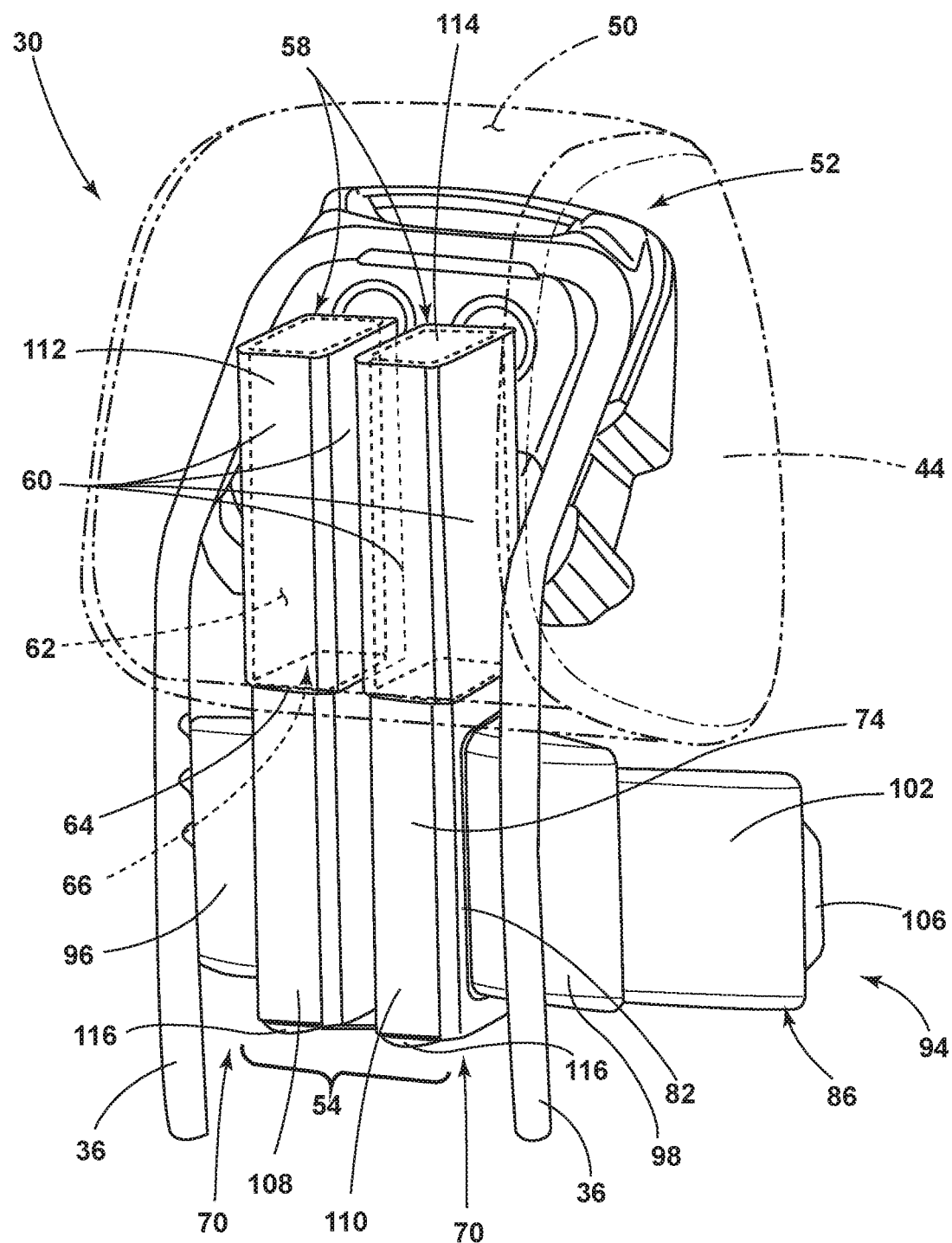
FIG. 6 is a perspective view of the interior of the headrest of FIG. 2, illustrating the housing from which the primary neck support section extends when the deployable neck support is in the deployed position.
Figure 7:
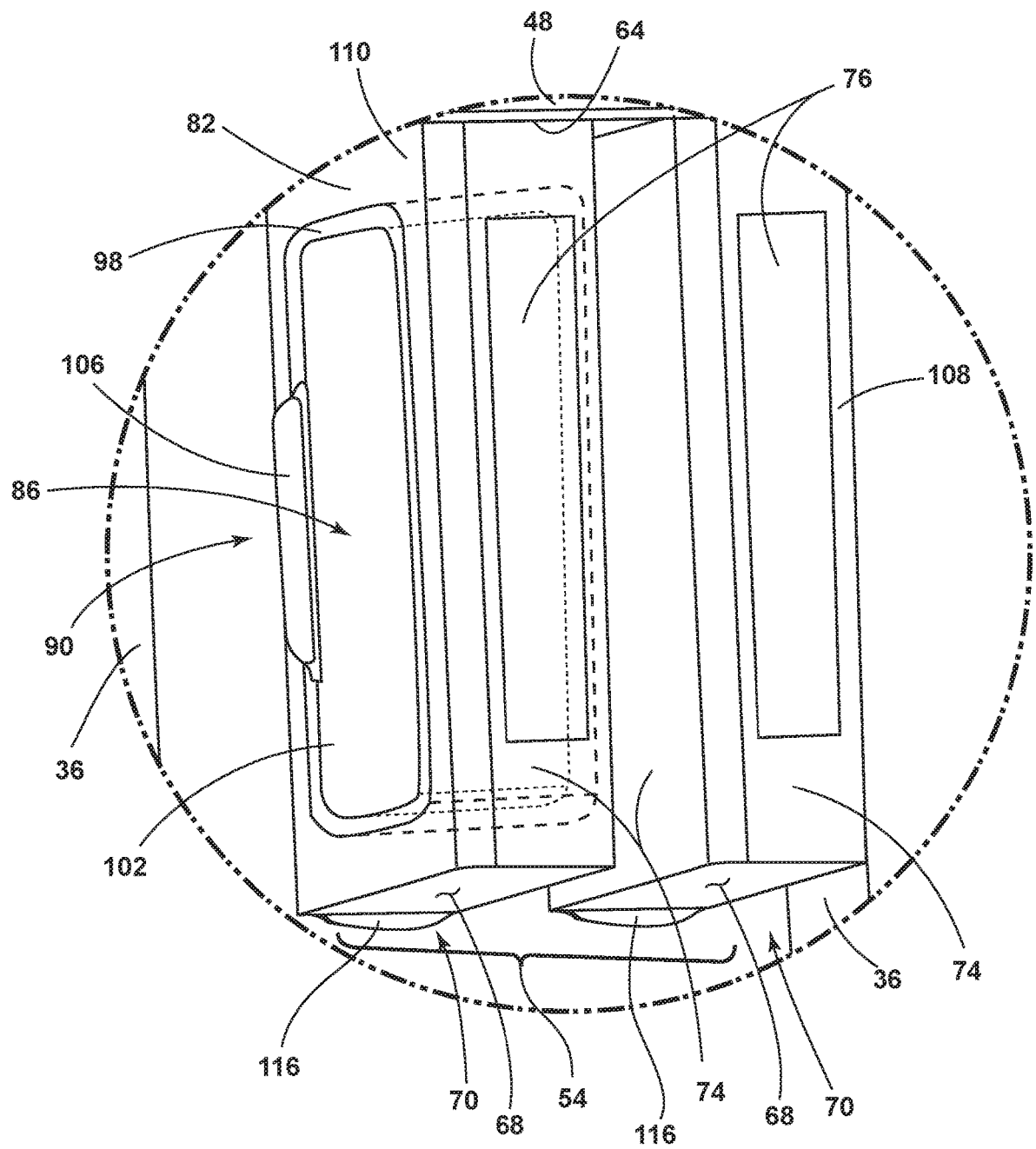
FIG. 7 is a perspective view of area VII of FIG. 4A, illustrating the outboard lateral neck support in an enclosed position within the primary neck support section.

Referring now particularly to FIG. 2, the first seating assembly 16 includes a headrest 30 extending from a top portion 32 of the seatback 24. The headrest 30 is generally configured to support the head 34 of the occupant 22 of the first seating assembly 16. The headrest 30 can be adjustably coupled to the seatback 24, such as via one or more rods 36 extending from the headrest 30 and into the seatback 24, typically through the top portion 32 of the seatback 24. As illustrated in FIG. 6, the one or more rods 36 extending from the headrest 30 may be one contiguous rod 36 that also provides structural support to the interior 52 of the headrest 30.

Referring now particularly to FIGS. 3-11 the headrest 30 can include a forward-facing portion 38, a rearward-facing portion 40, a midline 42, a first side 44 disposed to one side of the midline 42, a second side 46 disposed to the other side of the midline 42, and a downward-facing portion 48. The one or more rods 36 can extend from the downward-facing portion 48 of the headrest 30. The downward-facing portion 48 of the headrest 30 generally faces the top portion 32 of the seatback 24. The headrest 30 includes an external surface 50. The external surface 50 can be the external surface of trim, such as leather or fabric. The external surface 50 surrounds an interior 52 of the headrest 30.

The headrest 30 further includes a deployable neck support 54. The deployable neck support 54 has a non-deployed position 56 (see particularly FIG. 3). In the non-deployed position 56, the deployable neck support 54 can be "hidden" within the interior 52 of the headrest 30, that is, disposed nearly entirely or entirely within the interior 52. In the illustrated embodiment, the headrest 30 includes a housing 58 disposed in the interior 52. In the non-deployed position 56, the deployable neck support 54 is housed within the housing 58. The housing 58 includes one or more walled portions 60 (see FIG. 6) forming a chamber 62 into which the deployable neck support 54 resides while in the non-deployed position 56. The one or more walled portions 60 form a terminal edge 64 surrounding an opening 66 into the chamber 62. The terminal edge 64 and the opening 66 can be disposed at the downward-facing portion 48 of the headrest 30. The deployable neck support 54 further includes a bottom surface 68. When the deployable neck support 54 is in the non-deployed position 56, the bottom surface 68 is planar or approximately planar to (that is, flush with) a portion of the external surface 50 of the headrest 30 that is adjacent to (e.g., surrounding) the bottom surface 68 of the deployable neck support 54. When the deployable neck support 54 is in the non-deployed position 56, the headrest 30 can be adjusted downward, that is, toward the top portion 32 of the seatback 24.

The deployable neck support 54 further has a deployed position 70 (see, e.g., FIG. 4A), and can move to, from, and between the non-deployed position 56 and the deployed position 70. In the deployed position 70, the deployable neck support 54 is extended out of the interior 52 of the headrest 30. More particularly, in moving from the non-deployed position 56 to the deployed position 70, the deployable neck support 54 slides at least partially out of the housing 58, through the opening 66 of housing 58. The deployable neck support 54 slides within the chamber 62 of the housing 58. The deployable neck support 54 moves from the non-deployed position 56 to the deployed position 70 in the direction toward the top portion 32 of the seatback 24.

The deployable neck support 54 is configured to support the neck 72 (see FIG. 12) of an occupant 22 of the first seating assembly 16. The deployable neck support 54, in the deployed position 70 can be disposed about the midline 42, which is where the neck 72 of the occupant 22 of the first seating assembly 16 is likely to be. In addition, in the deployed position 70, the deployable neck support 54 is disposed between the headrest 30 and the top portion 32 of the seatback 24, which is the position where the neck 72 of the occupant 22 is most likely to be.

The deployable neck support 54 can include a primary neck support section 74 disposed adjacent the midline 42 and, optionally, an inboard lateral neck support 84 and an outboard lateral neck support 86 that extend laterally from the primary neck support section 74 away from the midline 42. The primary neck support section 74 can incorporate one or more cushions 76. The one or more cushions 76 are positioned to face the neck 72 of the occupant 22 of the first seating assembly 16. That is, the cushion 76 generally faces forward when the seatback 24 is in an upright position 78 as in FIGS. 1 and 2. The primary neck support section 74, when the deployable neck support 54 transitions from the non-deployed position 56 to the deployed position 70, moves (e.g., slides) generally downward when the seatback 24 is in the upright position 78. The primary neck support section 74 includes an inboard side 80 and an outboard side 82.

Figure 4A:
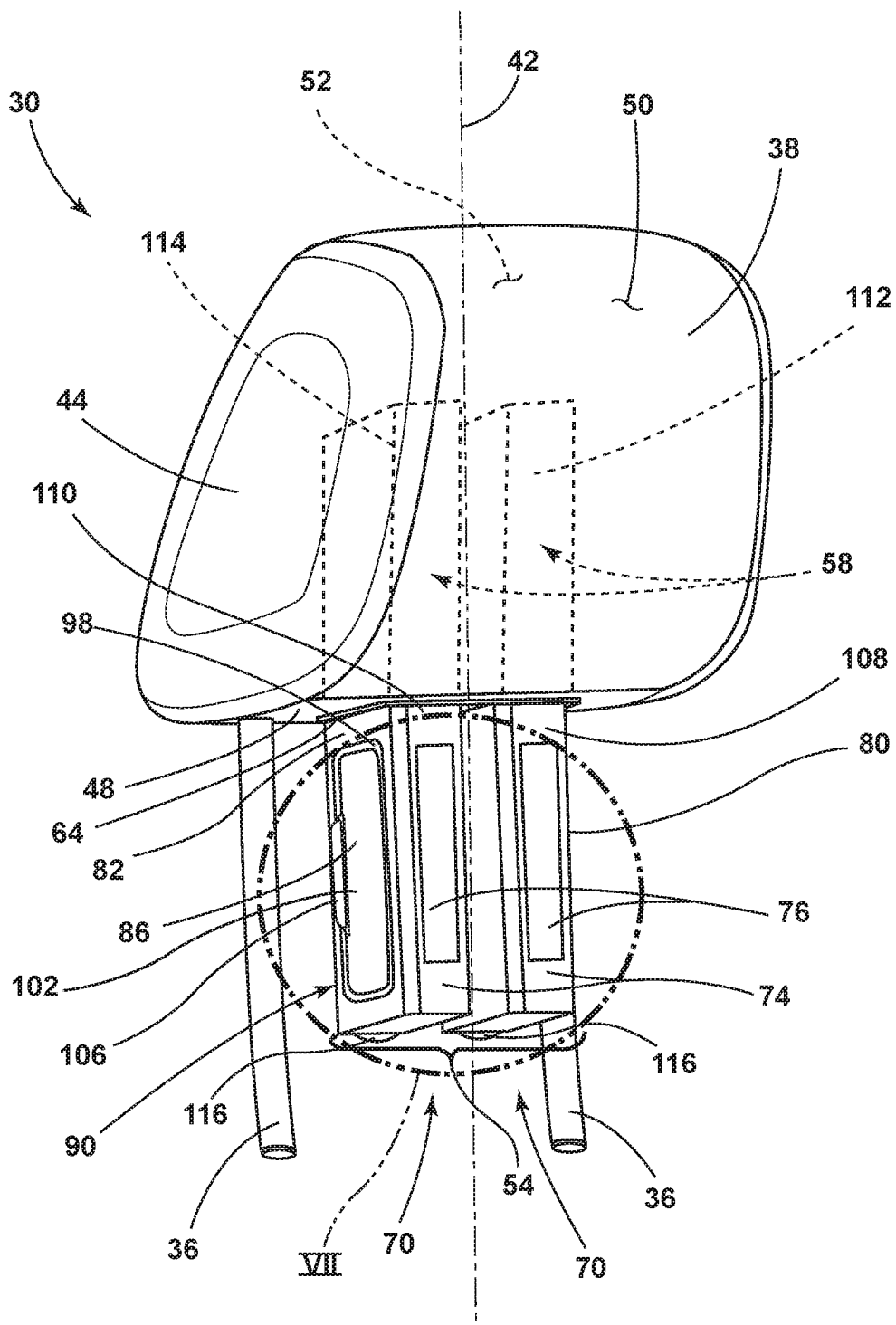
FIGS. 4A and 4B are perspective views of the headrest of FIG. 2, illustrating the deployable neck support in a deployed position with a primary neck support section extending downward from the housing and incorporating a neck-supporting cushion.
Figure 4B:
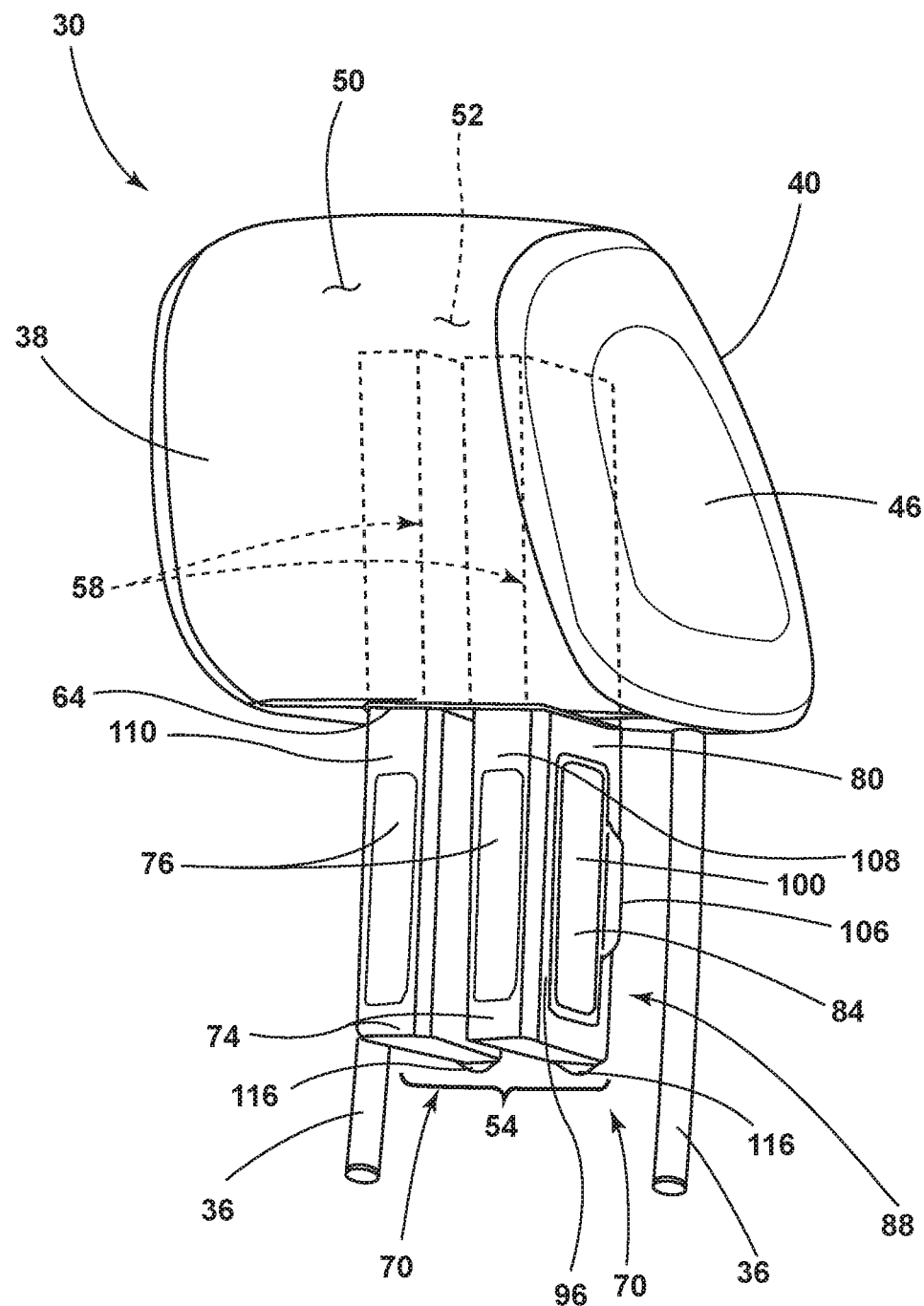
Figure 5:
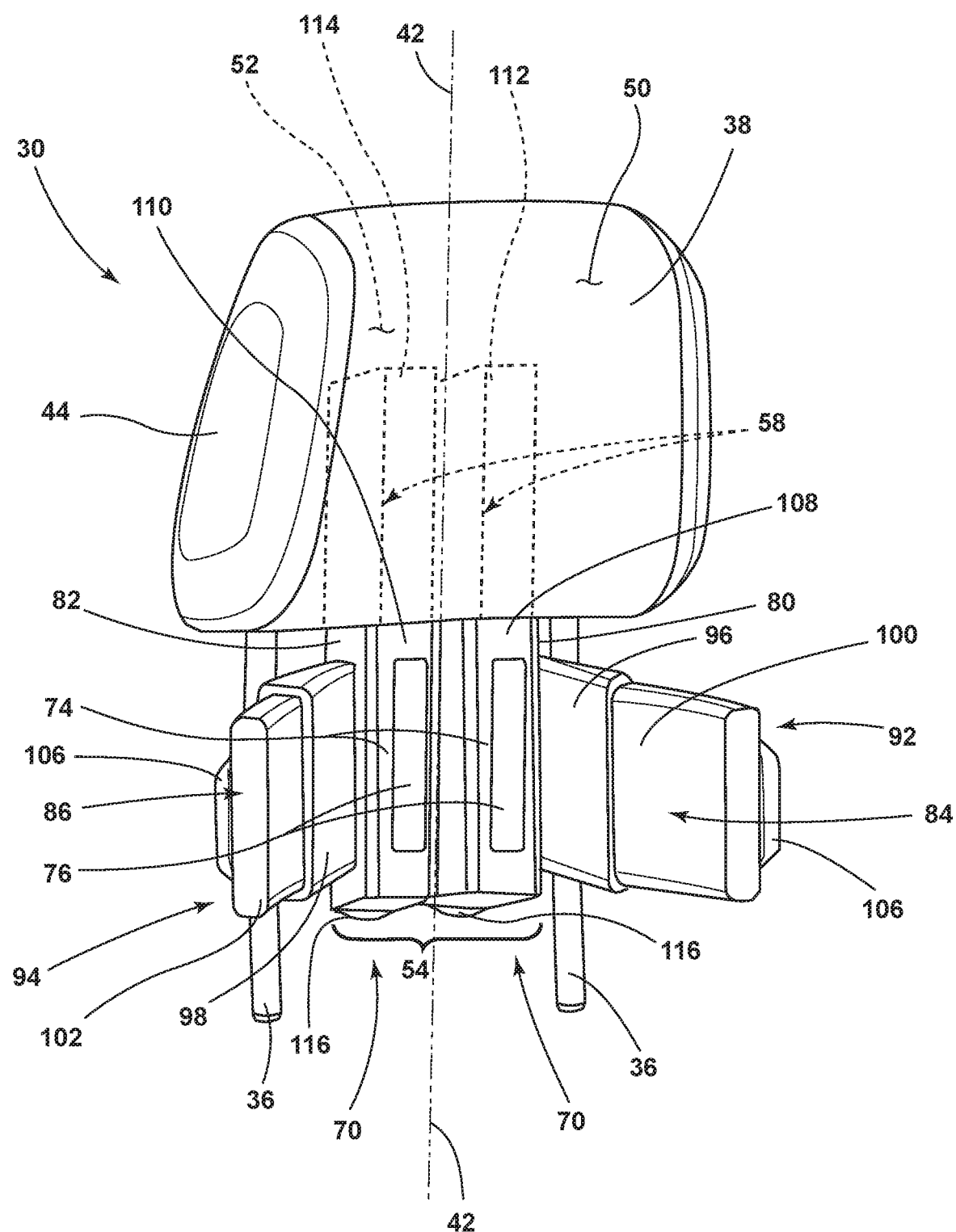
FIG. 5 is a perspective view of the headrest of FIG. 2, illustrating an outboard lateral neck support and an inboard lateral neck support in an extended position extending laterally and forward from the primary neck support section.

If incorporated into the deployable neck support 54, both the inboard lateral neck support 84 and the outboard lateral neck support 86 have an enclosed position 88, 90, respectively (see particularly FIGS. 4A and 4B). In the enclosed positions 88, 90, the inboard lateral neck support 84 and the outboard lateral neck support 86, respectively, are "hidden," that is, disposed (here, housed) within the primary neck support section 74. Both the inboard lateral neck support 84 and the outboard lateral neck support 86 have an extended position 92, 94, respectively, and can move to, from, and between the extended positions 92, 94 and the enclosed position 88, 90, respectively. In the extended positions 92, 94, the inboard lateral neck support 84 and the outboard lateral neck support 86, respectively, extend laterally from the primary neck support section 74. In the illustrated embodiment, the inboard lateral neck support 84 and the outboard lateral neck support 86 additionally extend forward. More specifically, in the extended position 92, the inboard lateral neck support 84 extends laterally, away from the midline 42, and forward from the inboard side 80 of the primary neck support section 74. Similarly, in the extended position 94, the outboard lateral neck support 86 extends laterally, away from the midline 42, and forward from the outboard side 82 of the primary neck support section 74.

Both the inboard lateral neck support 84 and the outboard lateral neck support 86 can include a first section 96, 98, respectively, and a second section 100, 102, respectively, that is telescopically coupled to the first section 96, 98, respectively. For example, when the inboard lateral neck support 84 is in the enclosed position 88, the second section 100 is at least partially disposed within the first section 96. When the inboard lateral neck support 84 is in the extended position 92, the second section 100 is telescoped laterally outward and, optionally, forward as illustrated, from the first section 96. Likewise, when the outboard lateral neck support 86 is in the enclosed position 90, the second section 102 is at least partially disposed within the first section 98, and when in the extended position 94, the second section 102 is telescoped laterally outward and, optionally, forward as illustrated, from the first section 98.

Figure 8:
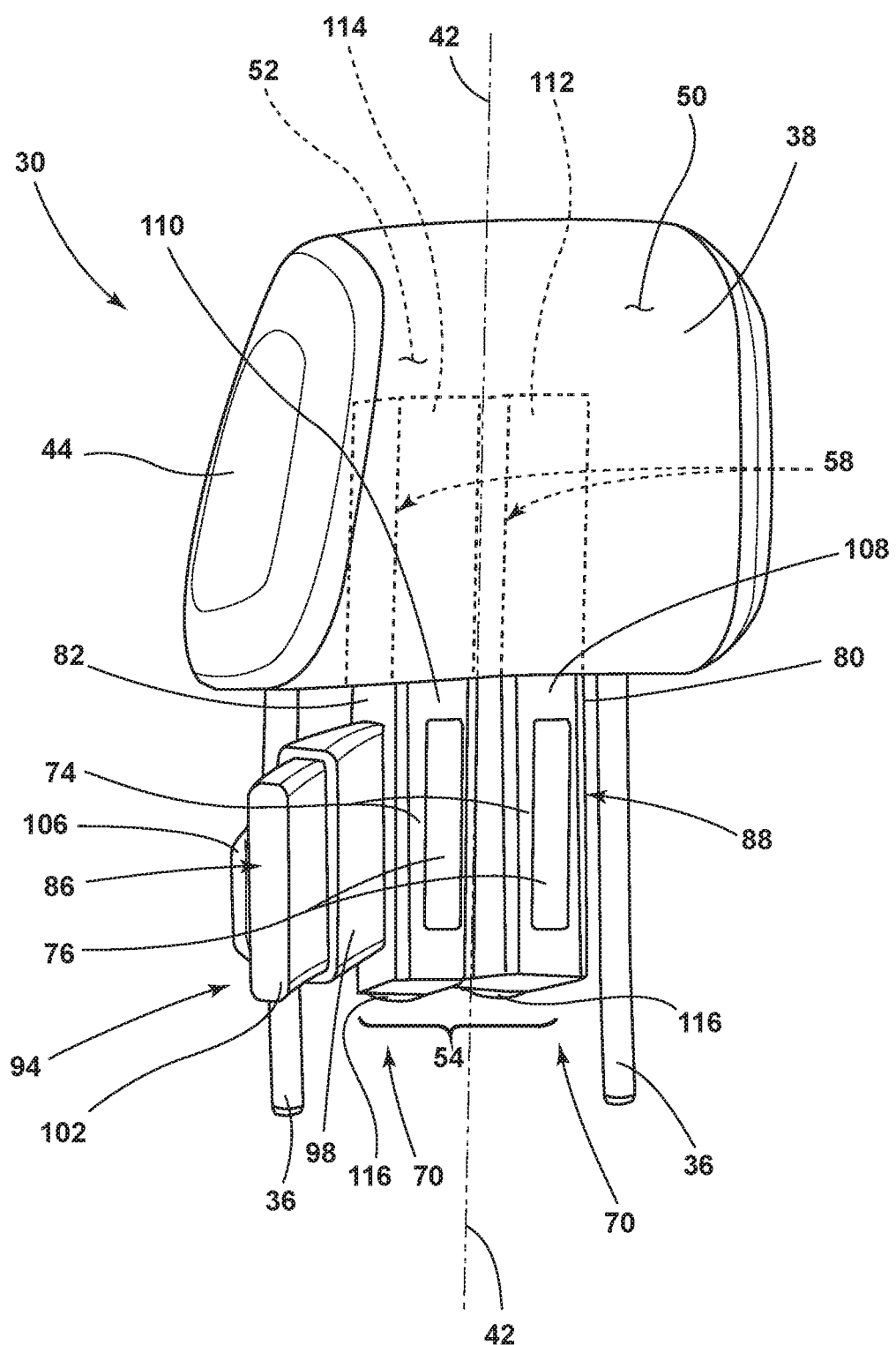
FIG. 8 is a perspective view of the headrest of FIG. 2, illustrating the outboard lateral neck support having moved to the extended position independently of the inboard lateral neck support, which is in the enclosed position within the primary neck support section.
Figure 9:
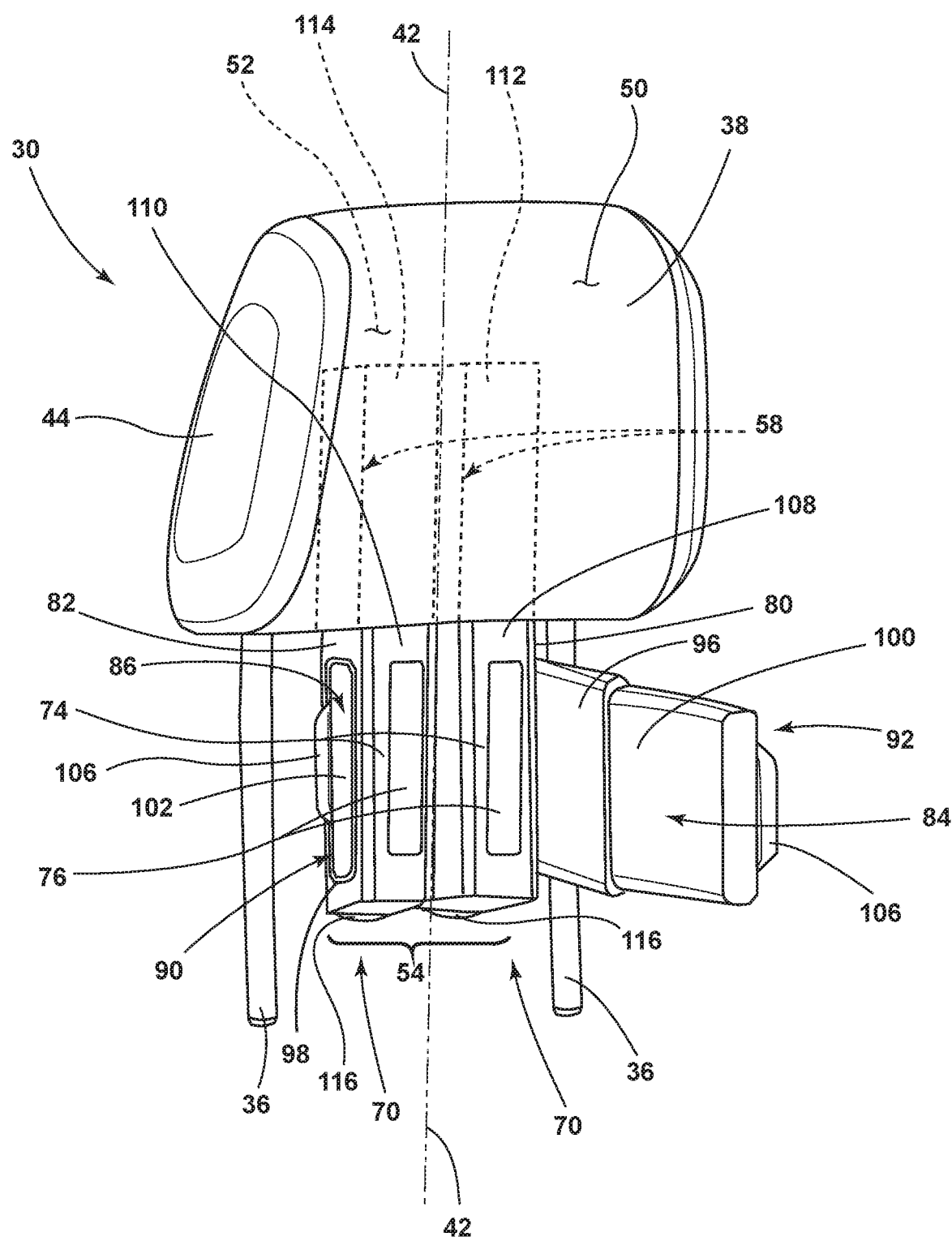
FIG. 9 is a perspective view of the headrest of FIG. 2, illustrating the inboard lateral neck support having moved to the extended position independently of the outboard lateral neck support, which is in the enclosed position within the primary neck support section.

Referring now to FIGS. 8 and 9, the inboard lateral neck support 84 and the outboard lateral neck support 86 can transition from their respective enclosed positions 88, 90, to their respective extended positions 92, 94, independently from each other. In other words, the outboard lateral neck support 86 can take the extended position 94 and can transition from the enclosed position 90 to the extended position 94, independently of whether the inboard lateral neck support 84 is in the enclosed position 88 or the extended position 92. As illustrated, the outboard lateral neck support 86 can be in the extended position 94 while the inboard lateral neck support 84 can be in the enclosed position 88. Likewise, the inboard lateral neck support 84 can take the extended position 92 and can transition from the enclosed position 88 to the extended position 92, independently of whether the outboard lateral neck support 86 is in the enclosed position 90 or the extended position 94. As illustrated, the inboard lateral neck support 84 can be in the extended position 92 while the outboard lateral neck support 86 can be in the enclosed position 90. Independent movement of the inboard lateral neck support 84 and the outboard lateral neck support 86 allows the occupant of the first seating assembly 16 to customize the deployable neck support 54 to accommodate the position of the head 34 and neck 72 of the occupant 22. For example, the occupant 22 might have the head 34 tilted to the outboard side 82. Thus, only the outboard lateral neck support 86 and not the inboard lateral neck support 84 would actually support the neck 72, and possibly the head 34, of the occupant 22. The occupant 22 could then cause only the outboard lateral neck support 86 to transition from the enclosed position 90 to the extended position 94. If the occupant 22 then shifted the head 34 to the inboard side 80, the occupant 22 could then cause the outboard lateral neck support 86 to transition from the extended position 94 to the enclosed position 90, and cause the inboard lateral neck support 84 to transition from the enclosed position 88 to the extended position 92.

A variety of mechanisms can cause the inboard lateral neck support 84 and the outboard lateral neck support 86 to transition from the enclosed position 88, 90, respectively, to the extended position 92, 94, respectively. For example, an internal spring system (not illustrated) can bias both the inboard lateral neck support 84 and the outboard lateral neck support 86 toward the extended position 92, 94, respectively, as well as bias the second sections 100, 102, respectively, to telescope out of the first sections 96, 98, respectively. The bias can be temporarily overcome by moving the inboard lateral neck support 84 and the outboard lateral neck support 86 to the enclosed position 88, 90, respectively. The bias can be unleashed by pulling or pushing on the inboard lateral neck support 84 or the outboard lateral neck support 86. Alternatively, air pressure (not illustrated) can cause the inboard lateral neck support 84 and the outboard lateral neck support 86 to transition from the enclosed position 88, 90, respectively, to the extended position 92, 94, respectively. For example, the inboard lateral neck support 84 and the outboard lateral neck support 86, including the first sections 96, 98 and second sections 100, 102, thereof, respectively, can be inflatable. Further, manual force, such as supplied by the occupant 22 pulling on a pull tab 106 disposed on the inboard lateral neck support 84 and the outboard lateral neck support 86, such as the second section 100, 102, respectively thereof, can cause the inboard lateral neck support 84 and the outboard lateral neck support 86 to transition from the enclosed position 88, 90, respectively, to the extended position 92, 94, respectively and the second section 100, 102 to telescope out of the first section 96, 98. As illustrated in FIGS. 4A and 4B, the pull tab 106 is accessible to be pulled, in the illustrated embodiment, on the first section 96, 98, when the inboard lateral neck support 84 and the outboard lateral neck support 86, respectively, are in the enclosed position 88, 90, respectively.

Figure 10:
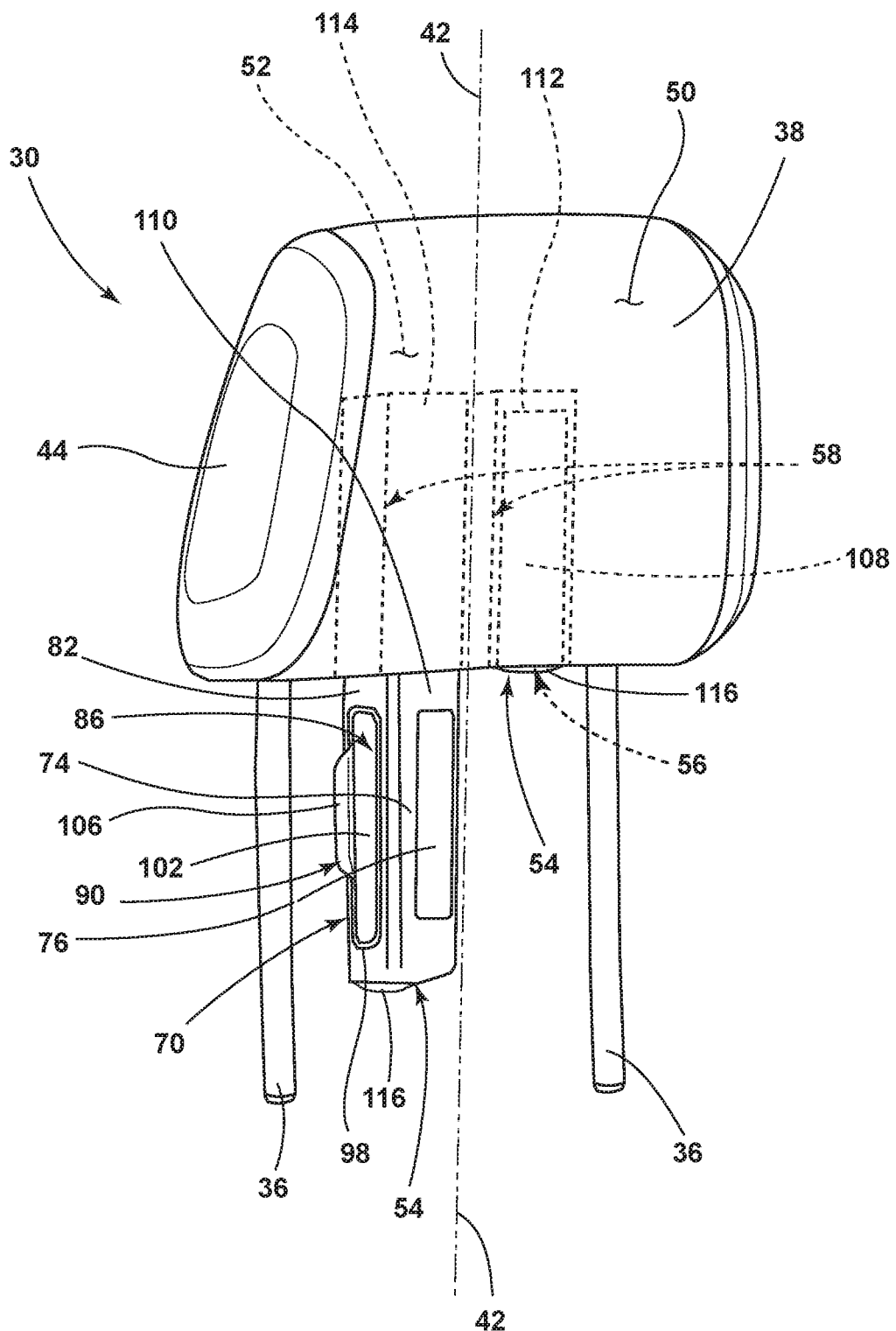
FIG. 10 is a perspective view of the headrest of FIG. 2, illustrating an outboard member of the primary neck support section having moved to the deployed position independently of an inboard member of the primary neck support section, which is in a non-deployed position housed within an inboard section of the housing.
Figure 11:
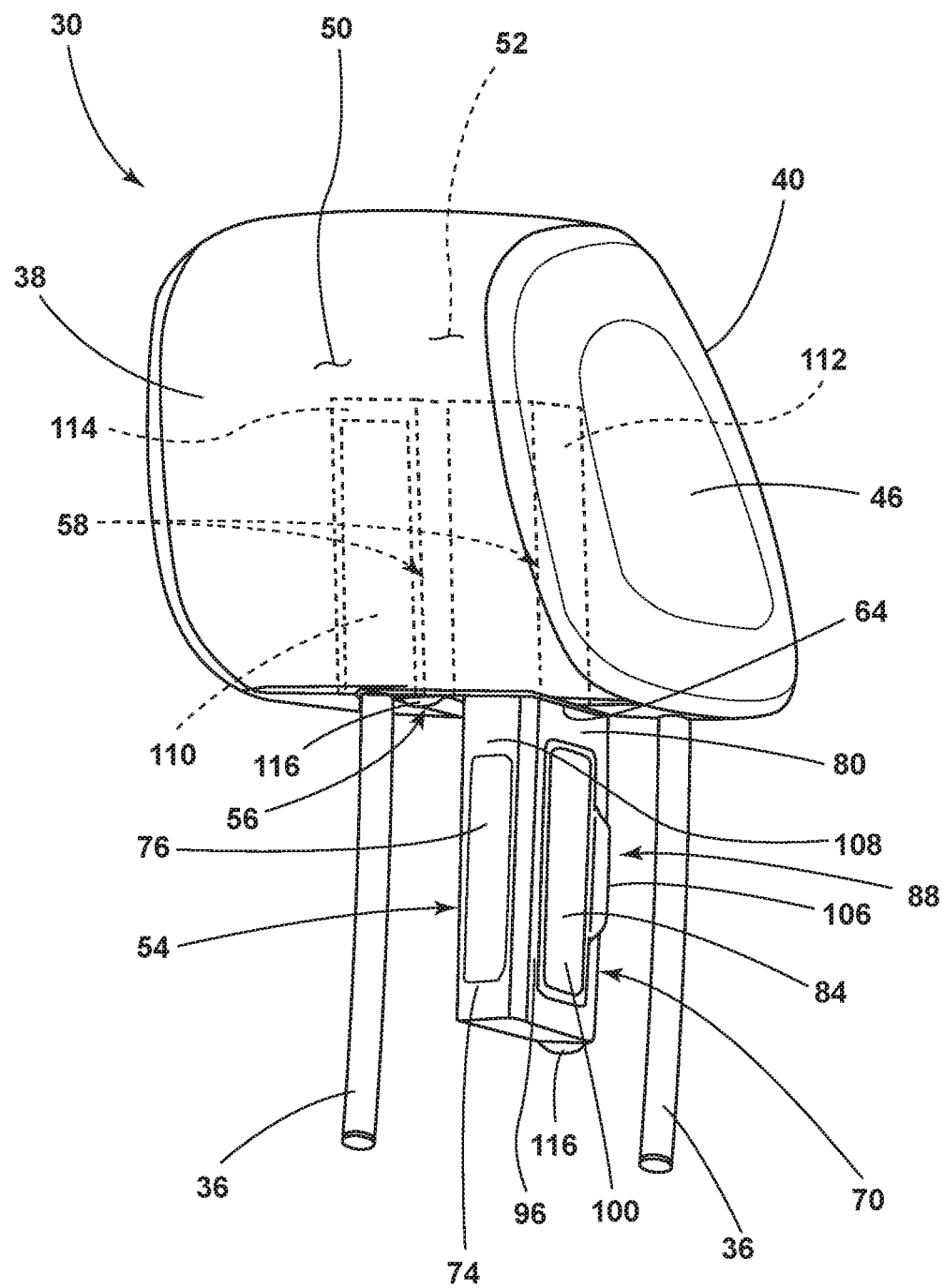
FIG. 11 is a perspective view of the headrest of FIG. 2, illustrating the inboard member having moved to the deployed position independently of the outboard member, which is in a non-deployed position housed within an outboard section of the housing.

Referring now to FIGS. 10 and 11, the primary neck support section 74 can be formed of two independently movable members, for example, an inboard member 108 and an outboard member 110 in the illustrated embodiment. The inboard side 80 of the primary neck support section 74 is part of the inboard member 108. The outboard side 82 of the primary neck support section 74 is part of the outboard member 110. The inboard member 108 and the outboard member 110 can move independently from the non-deployed position 56 to the deployed position 70. In other words, as illustrated in FIG. 10, the outboard member 110 can be moved to the deployed position 70 while the inboard member 108 remains in the non-deployed position 56. Similarly, as illustrated in FIG. 11, the inboard member 108 can be moved to the deployed position 70 while the outboard member 110 remains in the non-deployed position 56. In such a situation, the housing 58 can further include an inboard section 112 and an outboard section 114. The inboard section 112 and the outboard section 114 can be disposed symmetrically about the midline 42. The inboard member 108 of the primary neck support section 74 is disposed in the inboard section 112 of the housing 58, when the inboard member 108 is in the non-deployed position 56. However, when the inboard member 108 is moved to the deployed position 70, the inboard member 108 extends from the inboard section 112 of the housing 58. Similarly, the outboard member 110 is disposed in the outboard section 114, when the outboard member 110 is in the non-deployed position 56. When the outboard member 110 is moved to the deployed position 70, the outboard member 110 extends from the outboard section 114 of the housing 58.

Figure 3:
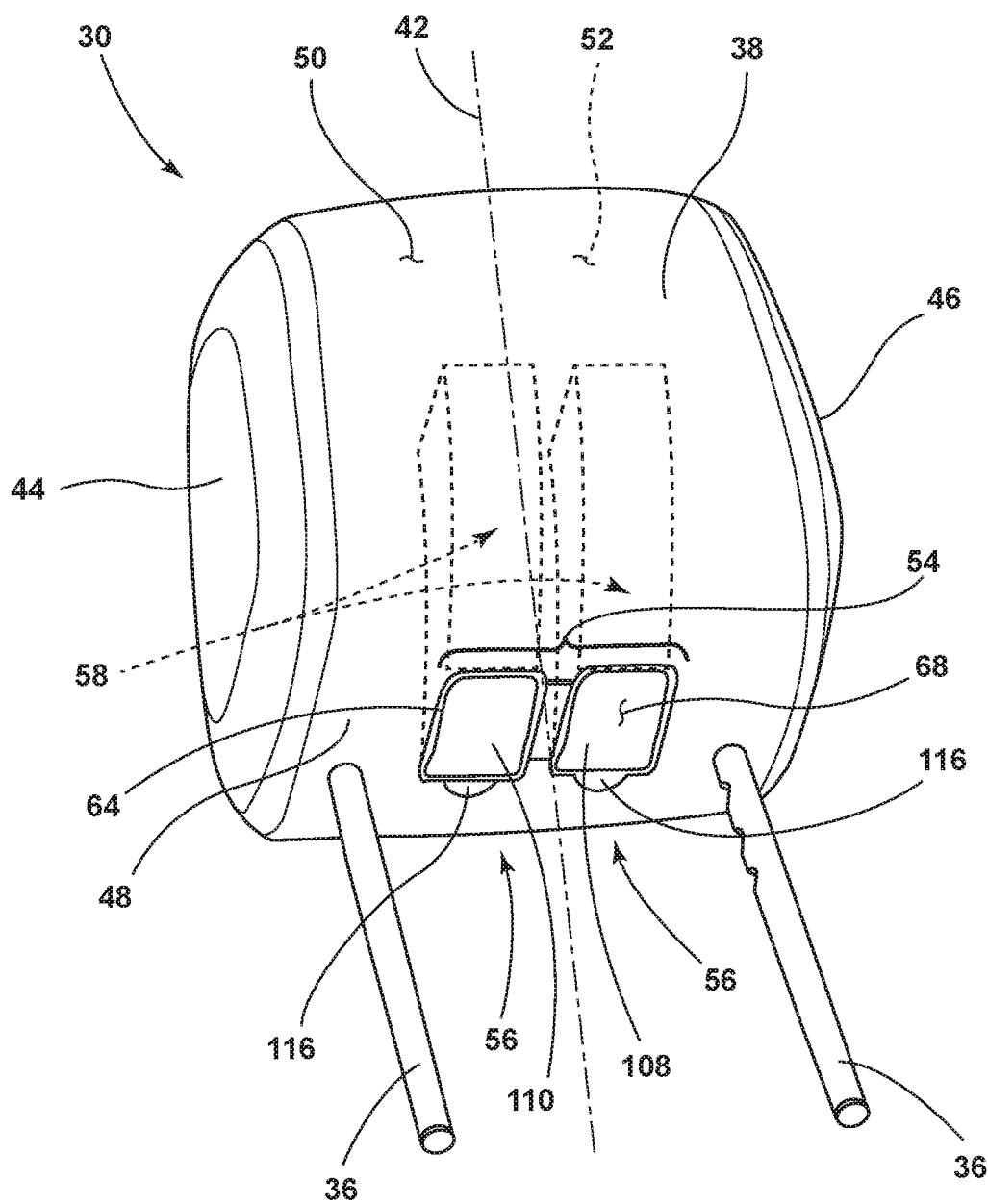
FIG. 3 is a perspective view of the headrest of FIG. 2, illustrating a deployable neck support in a non-deployed position, housed in a housing of an interior of the headrest.

Like the inboard lateral neck support 84 and the outboard lateral neck support 86, a variety of mechanisms can cause the primary neck support section 74 (including individually the inboard member 108 and the outboard member 110 thereof) to transition from the non-deployed position 56 to the deployed position 70. In addition to spring-biased and air pressure (inflation) mechanisms, manual force, such as supplied by the occupant pulling on a pull tab 116, can be utilized to transition the primary neck support section 74, including the inboard member 108 or outboard member 110 individually, from the non-deployed position 56 to the deployed position 70. The pull tabs 116 are accessible for the occupant to manipulate (i.e., for pulling), as illustrated in FIG. 3, the primary neck support section 74 toward the deployed position 70, while the primary neck support section 74 is in the non-deployed position 56.

Figure 12:
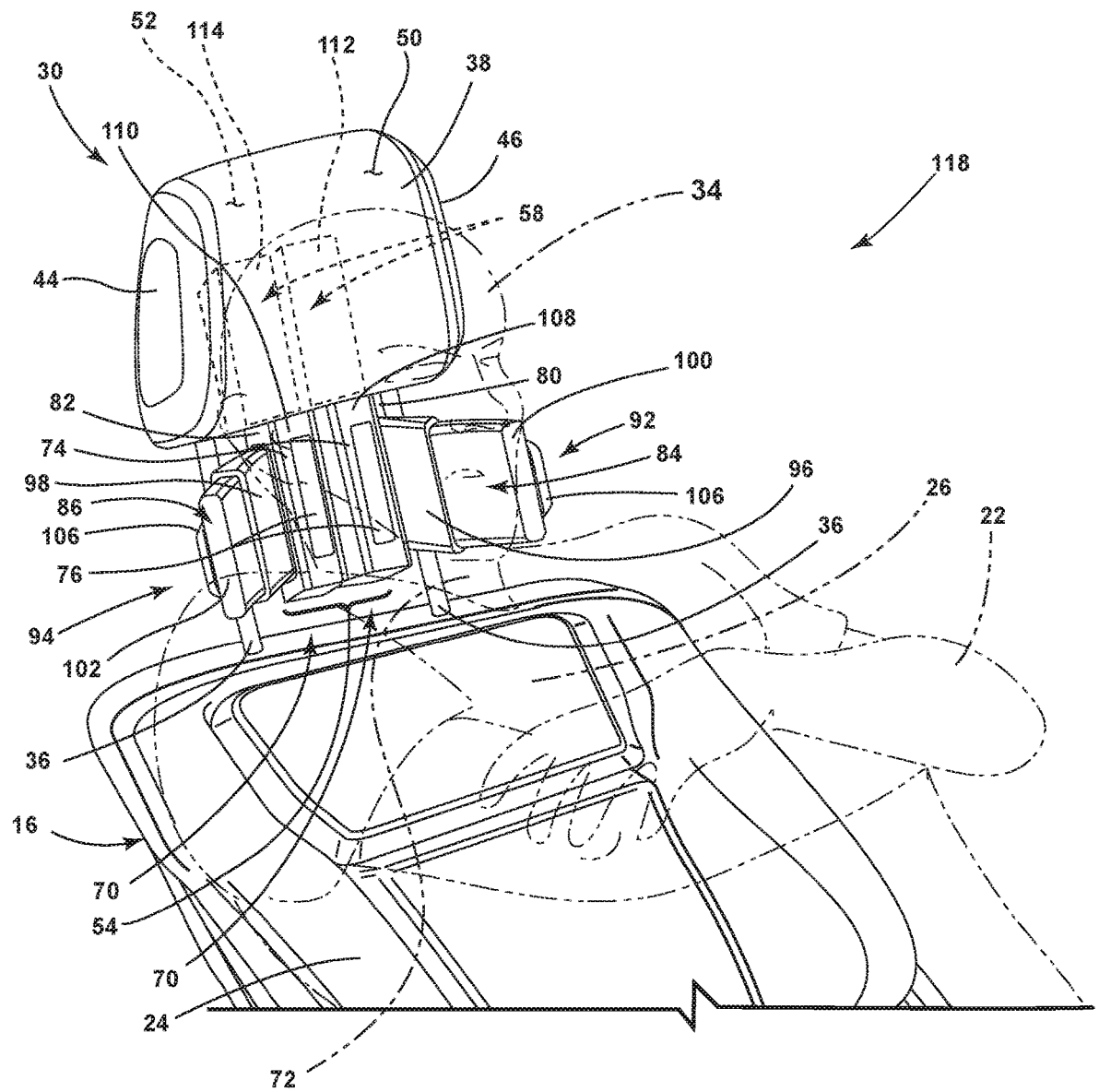
FIG. 12 is a perspective view of an occupant occupying the first seating assembly of FIG. 1 in a reclined position, with the deployable neck support in the deployed position and the inboard lateral neck support and the outboard lateral neck support in extended positions supporting a neck of the occupant.

Referring now to FIG. 12, the occupant 22 of the first seating assembly 16 has moved the seatback 24 into a reclined position 118. The occupant 22 has moved the deployable neck support 54 to the deployed position 70. More specifically, both the inboard member 108 and the outboard member 110 of the primary neck support section 74 are in the deployed position 70. Further, the occupant 22 has moved the inboard lateral neck support 84 and the outboard lateral neck support 86 to the extended positions 92, 94, respectively. The first seating assembly 16, through the support that the deployable neck support 54 provides, adequately supports the neck 72 of the occupant 22 while the seatback 24 is in the reclined position 118.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A headrest comprising:
an external surface, including a downward-facing portion, surrounding an interior;
a housing disposed in the interior, the housing forming a chamber and defining an opening into the chamber, the opening disposed at the downward-facing portion; and
a deployable neck support including:
a non-deployed position wherein the deployable neck support is housed within the housing; and
a deployed position wherein the deployable neck support extends out of the housing and is configured to support a neck of an occupant of a seating assembly incorporating the headrest;
wherein, in moving from the non-deployed position to the deployed position, the deployable neck support slides at least partially out of the housing, through the opening.

2. The headrest of claim 1,
the deployable neck support comprising a bottom surface;
wherein, in the non-deployed position, the bottom surface is flush with a portion of the external surface of the headrest adjacent the bottom surface.

3. The headrest of claim 2,
the housing further including a terminal edge surrounding the opening, and the terminal edge is disposed at the downward-facing portion of the headrest;
wherein, in the non-deployed position, the terminal edge is flush with the portion of the external surface of the headrest adjacent the bottom surface of the deployable neck support.

4. The headrest of claim 1,
the deployable neck support comprising a primary neck support section, the primary neck support section including a generally forward facing cushion.

5. The headrest of claim 1,
the deployable neck support comprising a primary neck support section;
wherein, as the deployable neck support moves from the non-deployed position to the deployed position, the primary neck support section slides generally downward.

6. The headrest of claim 5,
the primary neck support section further comprising an inboard member and an outboard member;
wherein, the inboard member and the outboard member can independently move from the non-deployed position to the deployed position.

7. The headrest of claim 6,
the housing further including an inboard section and an outboard section, symmetrically disposed about a midline of the headrest;
wherein, the inboard member of the primary neck support section is disposed in the inboard section of the housing when the inboard member is in the non-deployed position;
wherein, the inboard member of the primary neck support section extends from the inboard section of the housing when the inboard member is in the deployed position;
wherein, the outboard member of the primary neck support section is disposed in the outboard section of the housing when the outboard member is in the non-deployed position; and
wherein, the outboard member of the primary neck support section extends from the outboard section of the housing when the outboard member is in the deployed position.

8. The headrest of claim 5,
the primary neck support section further including a pull tab accessible for pulling the primary neck support section toward the deployed position when the primary neck support section is in the non-deployed position.

9. The headrest of claim 1,
the deployable neck support comprising a primary neck support section, the primary neck support section including an inboard side and an outboard side;
the deployable neck support further comprising an inboard lateral neck support and an outboard lateral neck support, each of the inboard lateral neck support and the outboard lateral neck support having an enclosed position and an extended position;
wherein, in the enclosed position, the inboard lateral neck support and the outboard lateral neck support are housed within the primary neck support section; and
wherein, in the extended position, the inboard lateral neck support extends laterally from the inboard side of the primary neck support section and the outboard lateral neck support extends laterally from the outboard side of the primary neck support section.

10. The headrest of claim 9,
both the inboard lateral neck support and the outboard lateral neck support include a first section and a second section, the second section being telescopically coupled to the first section;
wherein, in the enclosed position, the second section is at least partially disposed within the first section; and
wherein, in the extended position, the second section is telescoped laterally outward from the first section.

11. The headrest of claim 10,
the second section of both the inboard lateral neck support and the outboard lateral neck support includes a pull tab accessible to be pulled when the inboard lateral neck support and the outboard lateral neck support are in the enclosed position.

12. The headrest of claim 9,
wherein, the inboard lateral neck support can transition from the enclosed position to the extended position independently of whether the outboard lateral neck support is in the enclosed position or the extended position.

13. The headrest of claim 9,
wherein, air pressure causes the inboard lateral neck support and the outboard lateral neck support to transition from the enclosed position to the extended position.

14. The headrest of claim 9,
the inboard lateral neck support and the outboard lateral neck support both further include a pull tab accessible to be pulled when the inboard lateral neck support and the outboard lateral neck support are in the enclosed position.

15. The headrest of claim 1,
the deployable neck support further comprising:
a midline;
a primary neck support section disposed adjacent the midline;
an inboard lateral neck support, the inboard lateral neck support having an extended position where the inboard lateral neck support extends laterally from the primary neck support section away from the midline; and
an outboard lateral neck support, the outboard lateral neck support having an extended position where the outboard lateral neck support extends laterally from the primary neck support section away from the midline in a generally opposite direction as the inboard lateral neck support.

16. The headrest of claim 15,
the inboard lateral neck support has an enclosed position where the inboard lateral neck support is housed within the primary neck support section; and
the outboard lateral neck support has an enclosed position where the inboard lateral neck support is housed within the primary neck support section.

17. A seating assembly comprising:
a seatback including a top portion; and
a headrest extending from the top portion of the seatback, the headrest comprising:
an external surface surrounding an interior; and
a deployable neck support having a non-deployed position wherein the deployable neck support is disposed in the interior and a deployed position wherein the deployable neck support extends out of the interior and is configured to support a neck of an occupant of the seating assembly;
wherein, the deployable neck support moves from the non-deployed position to the deployed position in a direction toward the top portion of the seatback.

18. The seating assembly of claim 17,
the headrest further comprising:
a housing disposed in the interior, the housing including an opening; and
the deployable neck support comprises:
a primary neck support section, which includes a generally forward facing cushion, an inboard side, and an outboard side;
an inboard lateral neck support; and
an outboard lateral neck support, each of the inboard lateral neck support and the outboard lateral neck support having an enclosed position and an extended position;
wherein, in the non-deployed position, the deployable neck support is housed within the housing;
wherein, in the deployed position, the deployable neck support extends out of the housing;
wherein, in moving from the non-deployed position to the deployed position, the primary neck support section slides at least partially out of the housing, through the opening of the housing toward the top portion of the seatback;
wherein, in the enclosed position, the inboard lateral neck support and the outboard lateral neck support are housed within the primary neck support section;
wherein, in the extended position, the inboard lateral neck support extends laterally from the inboard side of the primary neck support section and the outboard lateral neck support extends laterally from the outboard side of the primary neck support section; and
wherein, the inboard lateral neck support can transition from the enclosed position to the extended position independently of whether the outboard lateral neck support is in the enclosed position or the extended position.

19. A vehicle comprising:
a seating assembly comprising:
a seatback including a top portion; and
a headrest extending from the top portion of the seatback, the headrest comprising:
an external surface surrounding an interior; and
a deployable neck support having a non-deployed position wherein the deployable neck support is disposed in the interior and a deployed position wherein the deployable neck support extends out of the interior and is configured to support a neck of an occupant of the seating assembly;
wherein, the deployable neck support moves from the non-deployed position to the deployed position in a direction toward the top portion of the seatback.

20. The vehicle of claim 19,
the headrest further comprising:
a housing disposed in the interior, the housing including an opening; and
the deployable neck support comprises:
a primary neck support section, which includes a generally forward facing cushion, an inboard side, and an outboard side;
an inboard lateral neck support; and
an outboard lateral neck support, each of the inboard lateral neck support and the outboard lateral neck support having an enclosed position and an extended position;
wherein, in the non-deployed position, the deployable neck support is housed within the housing;
wherein, in the deployed position, the deployable neck support extends out of the housing;
wherein, in moving from the non-deployed position to the deployed position, the primary neck support section slides at least partially out of the housing, through the opening of the housing toward the top portion of the seatback;
wherein, in the enclosed position, the inboard lateral neck support and the outboard lateral neck support are housed within the primary neck support section;
wherein, in the extended position of the inboard lateral neck support, the inboard lateral neck support extends laterally from the inboard side of the primary neck support section and in the extended position of the outboard lateral neck support, the outboard lateral neck support extends laterally from the outboard side of the primary neck support section; and
wherein, the inboard lateral neck support can transition from the enclosed position to the extended position independently of whether the outboard lateral neck support is in the enclosed position or the extended position.

* * * * *